Aug. 30, 1955  E. WIEDEMANN  2,716,356
DAMPING SYSTEM
Filed Jan. 28, 1953
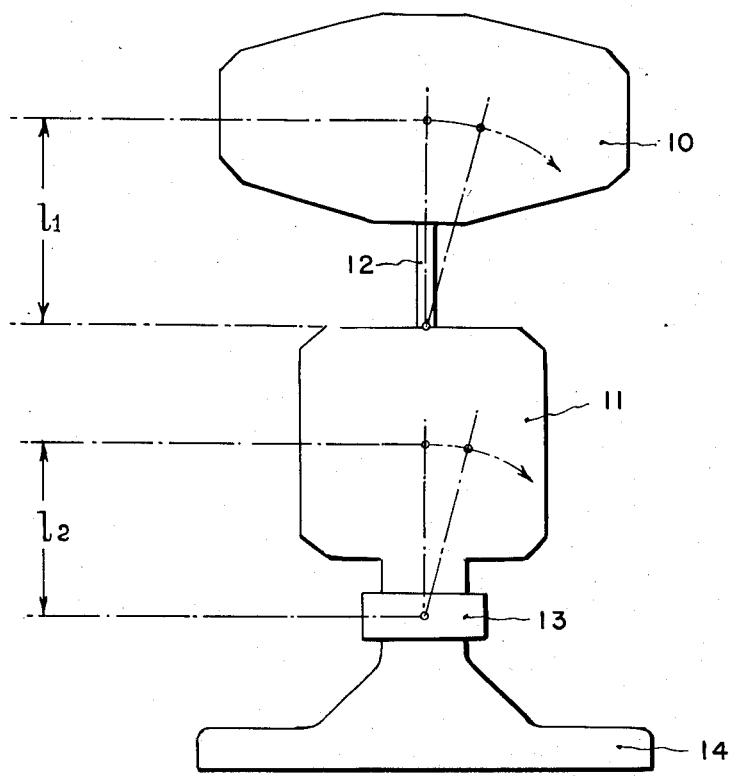
INVENTOR
ERWIN WIEDEMANN,
BY
ATTORNEYS

United States Patent Office 2,716,356
Patented Aug. 30, 1955

2,716,356
DAMPING SYSTEM

Erwin Wiedemann, Riehen, Switzerland, assignor to Sandoz A. G., Basel, Switzerland, a Swiss firm Application January 28, 1953, Serial No. 333,742

Claims priority, application Switzerland January 28, 1952

2 Claims. (Cl. 74—572)

The present invention relates to a method of damping rotary systems, such as self-centering centrifuge rotors and similar machines with vertical axes, which are normally operated above their critical speeds, the method enabling the speed of the said rotary system to be increased or decreased through the critical ranges without provoking dangerous resonance effects, even when the change in speed is effected very gradually.

It is known that the dangerous oscillations liable to occur at critical speeds can be prevented if the changes in speed are made very rapidly through the critical ranges. In this way, there is not sufficient time for the oscillations of the rotary system to attain dangerous amplitudes.

In many cases, however, the mass of the rotary system is so great that it is not possible to achieve a sufficiently rapid acceleration to prevent the oscillations reaching dangerous amplitudes. In these cases, attempts have been made to damp the oscillations by means of special attachments, such as rubber stops, springs, etc.

In contrast to these measures, the present invention relates to a machine which is so constructed that its two main parts exert a mutual damping effect, thus rendering the use of separate damping elements unnecessary. In copending application Serial No. 333,741, there is described a stable rotating system comprising a driven part (rotor) coupled by means of a flexible shaft to a driving system (motor) which is supported by a resilient mounting in such a way that the base-point of said flexible shaft has freedom of movement within certain limits about a mean position, especially in the horizontal plane. Since the driving part of such system may consist of an ordinary electric motor of relatively small dimensions, the critical speeds of this part usually lie above the range of speeds employed in practice (above 75,000 R. P. M.). On the other hand, the critical speeds of the driven part, the natural frequency of which is very low, lie within the lower ranges of speed. In the system described, therefore, it is only necessary to overcome the difficulties arising on passing through the critical speeds of the driven part (rotor). As the driving part and the driven part are coupled together by means of a flexible shaft, the critical oscillations of the driven part are partly transmitted to the driving part. Consequently, the driving part exerts a damping effect on the driven part, especially if the mass of the driving part is greater than the mass of the driven part. This damping effect can be reinforced so that it reaches maximal values by choosing the natural frequencies of the driven part (rotor) and the driving part (motor) in such a way that they are not in simple ratio to one another. It is considered to be the essential feature of the present invention that the dimensions of the driving part and the driven part are so chosen that their natural frequencies fulfill the above condition. When this is done, the critical oscillations of the driven part (rotor) are damped so effectively that it is possible to pass through the critical ranges of speed without the occurrence of significant oscillations, even when the change of speed is effected very slowly.

An example of a machine constructed in accordance with the present invention is illustrated diagrammatically in the accompanying drawing.

In this diagram, 10 is a rotor weighing approximately 3500 gm. and coupled by means of a flexible shaft 12 having a free length of 50 mm. with the armature of a motor 11. The pendulum length $l_1$ of the driven component (rotor 10 plus flexible shaft 12) is about 100 mm., the natural frequency $n_1$ about 170 per minute. The motor 11 is connected with the base plate 14 by means of one or more supports 13 having suitable elastic properties (e. g. of rubber), by means of which the natural frequency $n_2$ of the driving component can be adjusted. If the weight of the motor is about 12,000 gm. and its natural length $l_2$ about 140 mm. the natural frequency can be adjusted to about 400 per minute. The ratio between the two natural frequencies $n_1/n_2$ is then 17/40, thus fulfilling the conditions of the invention.

Having thus disclosed the invention what is claimed is:

1. A damping system applicable to a rotating system with vertical axis, and comprising a driving part provided with a driving axle, resilient supporting means upon which said driving part is mounted, and a driven part consisting of a rotor, a vertical flexible shaft supporting said rotor, the upper end of said flexible shaft being rigidly attached to the base of the said rotor while the lower end of said flexible shaft is rigidly attached to the axle of the said driving part, the natural frequency of the said driving part being determined by the mass of the said driving part and by the distance between its centre of gravity and the horizontal plane passing through the centre of oscillations of the resilient supporting means, and the natural frequency of the said driven part being determined by the mass of the said driven part and by the distance between its centre of gravity and the base-point of the said flexible shaft, these magnitudes being such that the natural frequencies of the said driving part and the said driven part are not in simple ratio to one another.

2. Damping system according to claim 1, wherein the mass of the driving component is at least as great as that of the driven component.

References Cited in the file of this patent

UNITED STATES PATENTS

| | | |
|---|---|---|
| 2,041,353 | Kenney et al. | May 19, 1936 |
| 2,589,796 | Geldhof | Mar. 18, 1952 |
| 2,615,657 | Young et al. | Oct. 28, 1952 |